United States Patent
Kobayashi et al.

(10) Patent No.: US 9,719,866 B2
(45) Date of Patent: Aug. 1, 2017

(54) SENSOR FAILURE DETECTION DEVICE, AND METHOD

(71) Applicant: FUJITSU LIMITED, Kawasaki-shi, Kanagawa (JP)

(72) Inventors: Sachio Kobayashi, Sagamihara (JP); Masayoshi Hashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 509 days.

(21) Appl. No.: 14/191,559

(22) Filed: Feb. 27, 2014

(65) Prior Publication Data

US 2014/0286372 A1    Sep. 25, 2014

(30) Foreign Application Priority Data

Mar. 21, 2013  (JP) ................................. 2013-057757

(51) Int. Cl.
*G01K 3/14*    (2006.01)
*G01K 15/00*   (2006.01)
(Continued)

(52) U.S. Cl.
CPC ........... *G01K 15/007* (2013.01); *G01K 1/026* (2013.01); *G01K 7/427* (2013.01)

(58) Field of Classification Search
CPC .............. G01J 5/0846; G01J 2005/0048; G01K 15/00; G01K 15/007; G01K 1/16; G01K 13/00; G01K 15/005; G01K 17/08
(Continued)

(56) References Cited

U.S. PATENT DOCUMENTS 4,440,508 A * 4/1984 Haloburdo, Jr. ......... G01K 7/14
                                              324/169
5,746,511 A * 5/1998 Eryurek ................. G01K 15/00
                                              374/2
(Continued)

FOREIGN PATENT DOCUMENTS

DE    102006018168 A1 * 10/2006 ............. G01K 15/00
JP    2002-168661         6/2002
(Continued)

OTHER PUBLICATIONS

Extended European Search Report issued Jan. 26, 2015 in corresponding European Patent Application No. 14158028.2.
(Continued)

*Primary Examiner* — Gail Kaplan Verbitsky
(74) *Attorney, Agent, or Firm* — Staas & Halsey LLP

(57) ABSTRACT

A sensor failure detection device includes a storage, a predictor, a calculator and a detector. The storage stores temperature information of individual sensors. The temperature information includes measured values of temperatures. The measured values of temperatures are measured by a plurality of sensors. The predictor predicts a temperature distribution by performing a thermal fluid simulation, on the basis of the temperature information received from a remaining sensor. The remaining sensor is a sensor of the plurality of sensors other than the test target sensor. The calculator calculates a difference value between a temperature at a position of the test target sensor in the temperature distribution and a temperature measured by the test target sensor. The detector detects that the difference value is higher than a predetermined value.

3 Claims, 17 Drawing Sheets

(51) Int. Cl.
*G01K 1/02* (2006.01)
*G01K 7/42* (2006.01)

(58) Field of Classification Search
USPC ... 374/1, 3, 137, 110, 112, 115, 166, 29, 30, 374/102; 702/99, 130, 107, 108
See application file for complete search history.

(56) References Cited

U.S. PATENT DOCUMENTS

| | | | |
|---|---|---|---|
| 6,598,195 B1 | 7/2003 | Adibhatla et al. | |
| 6,687,637 B2* | 2/2004 | Garabedian | G05B 9/02 342/41 |
| 7,623,999 B2 | 11/2009 | Clayton | |
| 9,372,131 B2* | 6/2016 | Martin | G01L 15/00 |
| 2003/0118079 A1* | 6/2003 | Marinet | G01K 3/005 374/178 |
| 2004/0059538 A1* | 3/2004 | Fulton | G01K 7/206 702/130 |
| 2008/0136402 A1 | 6/2008 | Sato | |
| 2009/0052494 A1* | 2/2009 | Wijffels | G01N 25/482 374/10 |
| 2013/0223472 A1* | 8/2013 | Maston | G01K 15/00 374/2 |
| 2014/0192834 A1* | 7/2014 | Bronlund | G01K 15/00 374/1 |
| 2016/0161347 A1* | 6/2016 | Morinaga | G01K 15/007 374/1 |

FOREIGN PATENT DOCUMENTS

JP 2010-122081 6/2010
WO WO 0203309 A1 * 1/2002 ............. B22D 17/32

OTHER PUBLICATIONS

Jeonghwan Choi et al. "A CDF-Based Tool for Studying Temperature in Rack-Mounted Servers", IEEE Transactions on Computers, vol. 57, No. 8 Aug. 2008, pp. 1129-1142.

"Computational Fluid Dynamics Modeling of High Compute Density Data Centers to Assure System Inlet Air Specifications", Proceedings of IPACK'01, The Pacific Rim/ASME International Electronic Packaging Conference and Exhibition, Jul. 8-13, 2001, Kauai, Hawaii, USA, IPACK2001-15622.

"Balance of Power, Dynamic Thermal Management for Internet Data Centers", IEEE Internet Computing, Jan./Feb. 2005, pp. 42-49.

* cited by examiner

| TIME | SENSOR ID | TEMPERATURE |
|---|---|---|
| 1.00 | 1 | 25.3142 |
| 1.00 | 5 | 25.3413 |
| 1.00 | 9 | 25.3713 |
| 1.00 | 13 | 25.4111 |
| 1.00 | 17 | 25.4141 |
| 1.00 | 21 | 25.3697 |
| 1.00 | 25 | 25.3338 |
| 1.00 | 29 | 25.3047 |
| 2.00 | 1 | 25.31 |
| 2.00 | 5 | 25.3388 |
| 2.00 | 9 | 25.3708 |
| 2.00 | 13 | 25.4128 |
| 2.00 | 17 | 25.4159 |
| 2.00 | 21 | 25.369 |
| 2.00 | 25 | 25.3311 |
| 2.00 | 29 | 25.3002 |
| 3.00 | 1 | 25.2904 |
| 3.00 | 5 | 25.3199 |
| 3.00 | 9 | 25.3526 |

401 TIME
402 SENSOR ID
403 TEMPERATURE
404

| CELL NUMBER | VELOCITY X | VELOCITY Y | VELOCITY Z | TEMPERATURE |
|---|---|---|---|---|
| 0 | 0 | 0 | 0 | 25 |
| 1 | 0 | 0 | 0 | 25 |
| 2 | 0 | 0 | 0 | 25 |
| 3 | 0 | 0 | 0 | 25 |
| 4 | 0 | 0 | 0 | 25 |
| 5 | 0 | 0 | 0 | 25 |
| 6 | 0 | 0 | 0 | 25 |
| 7 | 0 | 0 | 0 | 25 |
| 8 | 0 | 0 | 0 | 25 |
| 9 | 0 | 0 | 0 | 25 |
| ... | ... | ... | ... | ... |
| 39 | 0.0754 | 0.004281 | 0 | 23.3209 |
| 40 | 0.092263 | 0.004276 | 0 | 23.241 |
| 41 | 0.109233 | 0.004313 | 0 | 23.17781 |
| 42 | 0.126026 | 0.004361 | 0 | 23.131 |
| 43 | 0.142319 | 0.004389 | 0 | 23.1 |
| 44 | 0.157718 | 0.00436 | 0 | 23.0861 |
| 45 | 0.171713 | 0.004229 | 0 | 23.0919 |
| 46 | 0.183639 | 0.003941 | 0 | 23.1219 |
| 47 | 0.192613 | 0.003438 | 0 | 23.183 |
| 48 | 0.197567 | 0.002675 | 0 | 23.2854 |
| 49 | 0.197275 | 0.001624 | 0 | 23.4437 |
| 50 | 0.191093 | 0.000302 | 0 | 23.6202 |

| TIME (701) | SENSOR ID (702) | TEMPERATURE (703) |
|---|---|---|
| 1.00 | 1 | 25.3789 |
| 1.00 | 5 | 25.3311 |
| 1.00 | 9 | 25.2921 |
| 1.00 | 13 | 25.2597 |
| 1.00 | 17 | 25.2479 |
| 1.00 | 21 | 25.279 |
| 1.00 | 25 | 25.3133 |
| 1.00 | 29 | 25.3564 |
| 2.00 | 1 | 25.3592 |
| 2.00 | 5 | 25.3111 |
| 2.00 | 9 | 25.2716 |
| 2.00 | 13 | 25.2382 |
| 2.00 | 17 | 25.2257 |
| 2.00 | 21 | 25.2579 |
| 2.00 | 25 | 25.2931 |
| 2.00 | 29 | 25.3365 |
| 3.00 | 1 | 25.3392 |
| 3.00 | 5 | 25.2908 |
| 3.00 | 9 | 25.2507 |

| RECORDING ID 1501 | TIME 1502 | SENSOR ID 1503 | ERROR 1504 | NORMALITY 1505 | ABNORMALITY 1506 |
|---|---|---|---|---|---|
| 1 | 1/2/2012 2:23 | 4 | 0.23 | 1 | 0 |
| 2 | 1/2/2012 2:23 | 8 | 10.32 | 0 | 1 |
| 3 | 1/2/2012 2:23 | 42 | 1.23 | 0 | 1 |
| 4 | 1/2/2012 2:23 | 33 | 0.001 | 1 | 0 |
| 5 | 1/2/2012 2:25 | 4 | 0.02 | 1 | 0 |
| 6 | 1/2/2012 2:26 | 4 | 2.5 | 0 | 1 |
| 7 | 1/2/2012 2:28 | 31 | 0.63 | 0 | 1 |
| 8 | 1/2/2012 2:28 | 94 | 0.42 | 1 | 0 |
| 9 | 1/2/2012 2:30 | 5 | 0.11 | 1 | 0 |
| 10 | 1/2/2012 2:31 | 101 | 0.01 | 1 | 0 |
| ... | ... | ... | ... | ... | ... |

| SENSORID 1601 | FAILURE 1602 | PASS 1603 |
|---|---|---|
| 1 | 0 | 1 |
| 2 | 0 | 1 |
| 3 | 0 | 0 |
| 4 | 1 | 0 |
| 5 | 0 | 0 |
| 6 | 0 | 0 |
| 7 | 0 | 0 |
| 8 | 0 | 0 |
| 9 | 0 | 1 |
| 10 | 0 | 0 |
| ... | ... | ... |

1600

1604

SENSOR FAILURE DETECTION DEVICE, AND METHOD

CROSS-REFERENCE TO RELATED APPLICATION

This application is based upon and claims the benefit of priority of the prior Japanese Patent Application No. 2013-057757, filed on Mar. 21, 2013, the entire contents of which are incorporated herein by reference.

FIELD

The embodiments discussed herein are related to a sensor failure detection device, a method, and a program, which detect a failure of a sensor.

BACKGROUND

Various kinds of devices including computers such as a main frame and various kinds of servers, various kinds of communication devices such as a router and a switching hub, and so forth are desired to operate in temperature ranges in which these devices are capable of performing normal operations. The reason is that, for example, if these devices are caused to operate in high-temperature environments, operation malfunctions occur or the deterioration of components is accelerated, which causes a failure. In general, in the operation of a data center, a large number of sensors are installed that are used for monitoring whether these devices operate in temperature ranges in which these devices are capable of performing normal operations. In a large-scaled data center, the number of sensors has been hugely increased.

These sensors are connected to a network. Pieces of temperature data measured by the sensors are monitored by a monitoring device such as an operation management server. On the basis of the pieces of temperature data measured by the sensors, the monitoring device performs the temperature management of the installation environments of the sensors and monitors failures in the devices of the sensors themselves.

By detecting that temperature data measured by a specific sensor has not been given notice of or no response about the confirmation of being alive has been received from the specific sensor, the monitoring device detects a failure accompanied with total breakdown due to the disconnection, short circuit, or the like of a sensor internal circuit.

However, even if a sensor has failed and measures an erroneous temperature, it may be difficult for the monitoring device to detect the failure when the sensor has given notice of temperature data and a response about the confirmation of being alive has been performed.

The monitoring device sets an adequate range as an operating environment temperature, with respect to a monitoring target such as, for example, a server. When the operating environment temperature of the monitoring target has exceeded the adequate range, the monitoring device gives an alarm and gives notice to an administrator. When actually the operating environment temperature of the monitoring target falls within the adequate range, if a failed sensor has given notice of an inadequate temperature, the monitoring device turns out to give an alarm, and as a result, the administrator looks at the failed sensor. However, when the operating environment temperature of the monitoring target is an inadequate temperature, the monitoring device gives no alarm if the failed sensor has given notice of an adequate temperature. As a result, it may be difficult for the administrator to detect the malfunction of the operating environment temperature of the monitoring target.

On the other hand, there has been a mechanism that visualizes and manages a change in a temperature due to air conditioning within a data center, using thermal fluid simulation. Such a mechanism has been disclosed in Chandrakant D. Patel, Cullen E. Bash, and Christian Belady, "Computational Fluid Dynamics Modeling of High Compute Density Data Centers to Assure System Inlet Air Specifications", *Proceedings of IPACK'01, The Pacific Rim/ASME International Electronic Packaging Technical Conference and Exhibition*, Kauai, Hi., USA, IPACK2001-15622, Jul. 8-13, 2001 or Ratnesh K. Sharma, Cullen E. Bash, Chandrakant D. Patel, and Richard J. Friedrich, Hewlett-Packard Laboratories, Jeffrey S. Chase Duke University, "Balance of Power, Dynamic Thermal Management for Internet Data Centers", *IEEE INTERNET COMPUTING*, pp. 42-49, JANUARY/FEBRUARY 2005. According to this technique, it may be possible for a computer to display a temperature distribution within a data center, in a temporal sequence. In addition, on the basis of the actual temperature of the data center at a time, it may be possible for the computer to calculate the temperature of the data center after a predetermined time has elapsed.

SUMMARY

According to an aspect of the embodiment, a sensor failure detection device includes a storage configured to store temperature information of individual sensors, the temperature information including measured values of temperatures, the measured values of temperatures being measured by a plurality of sensors, a predictor configured to predict a temperature distribution by performing a thermal fluid simulation, on the basis of the temperature information received from a remaining sensor, the remaining sensor being a sensor of the plurality of sensors other than the test target sensor, a calculator configured to calculate a difference value between a temperature at a position of the test target sensor in the temperature distribution and a temperature measured by the test target sensor, and a detector configured to detect that the difference value is higher than a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram of an actual measured value due to a sensor according to the present embodiment;

FIG. 6 is an explanatory diagram of a result of a thermal fluid simulation according to the present embodiment;

FIG. 7 is an explanatory diagram of a result of a thermal fluid simulation according to the present embodiment;

FIG. 15 is an explanatory diagram illustrating an example of a data configuration according to the present embodiment;

FIG. 16 is an explanatory diagram illustrating an example of a data configuration according to the present embodiment.

DESCRIPTION OF EMBODIMENTS

Hereinafter, embodiments of a failure detection device, a method, and a program, which are disclosed, will be described in detail with reference to accompanying drawings.

Figure 1:
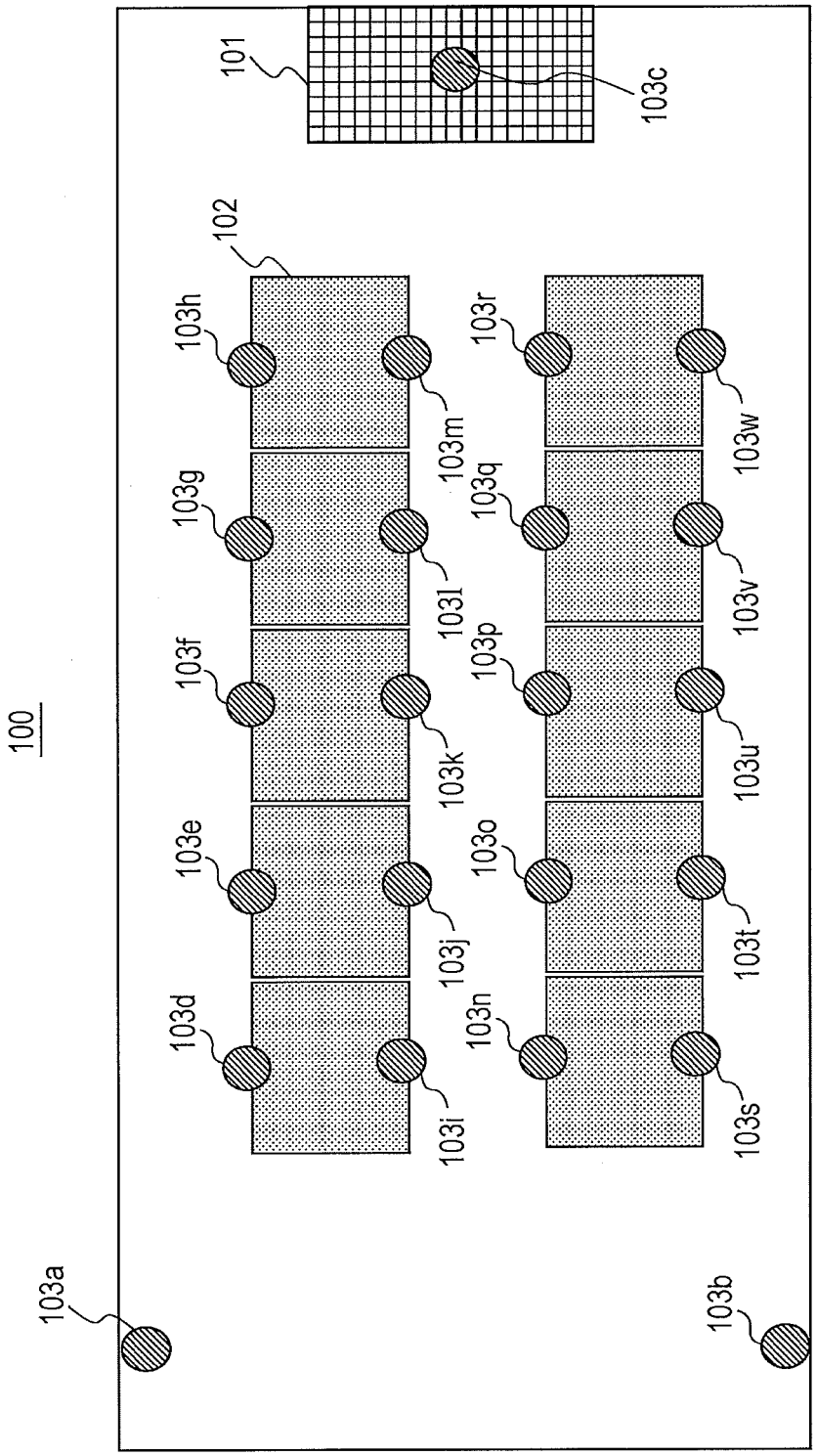
FIG. 1 is an explanatory diagram of a whole data center according to the present embodiment.

FIG. 1 is an explanatory diagram illustrating an example of a whole data center according to the present embodiment. A data center 100 according to the present embodiment includes one air conditioner 101, and 10 sets of server racks 102, and 23 sensors 103. In the server racks 102, various kinds of servers, storage devices, network devices, power-supply devices, and other devices are mounted (not illustrated). Many of these devices produce heat owing to operations. Under a high temperature environment, in these devices, the processing capacities thereof are reduced or malfunctions occur in some cases. These devices are cooled by the air conditioner 101. By measuring an air temperature within a device or a data center, the sensor 103 detects an abnormal increase in a temperature, which may lead to being placed under a high temperature environment.

Figure 2:
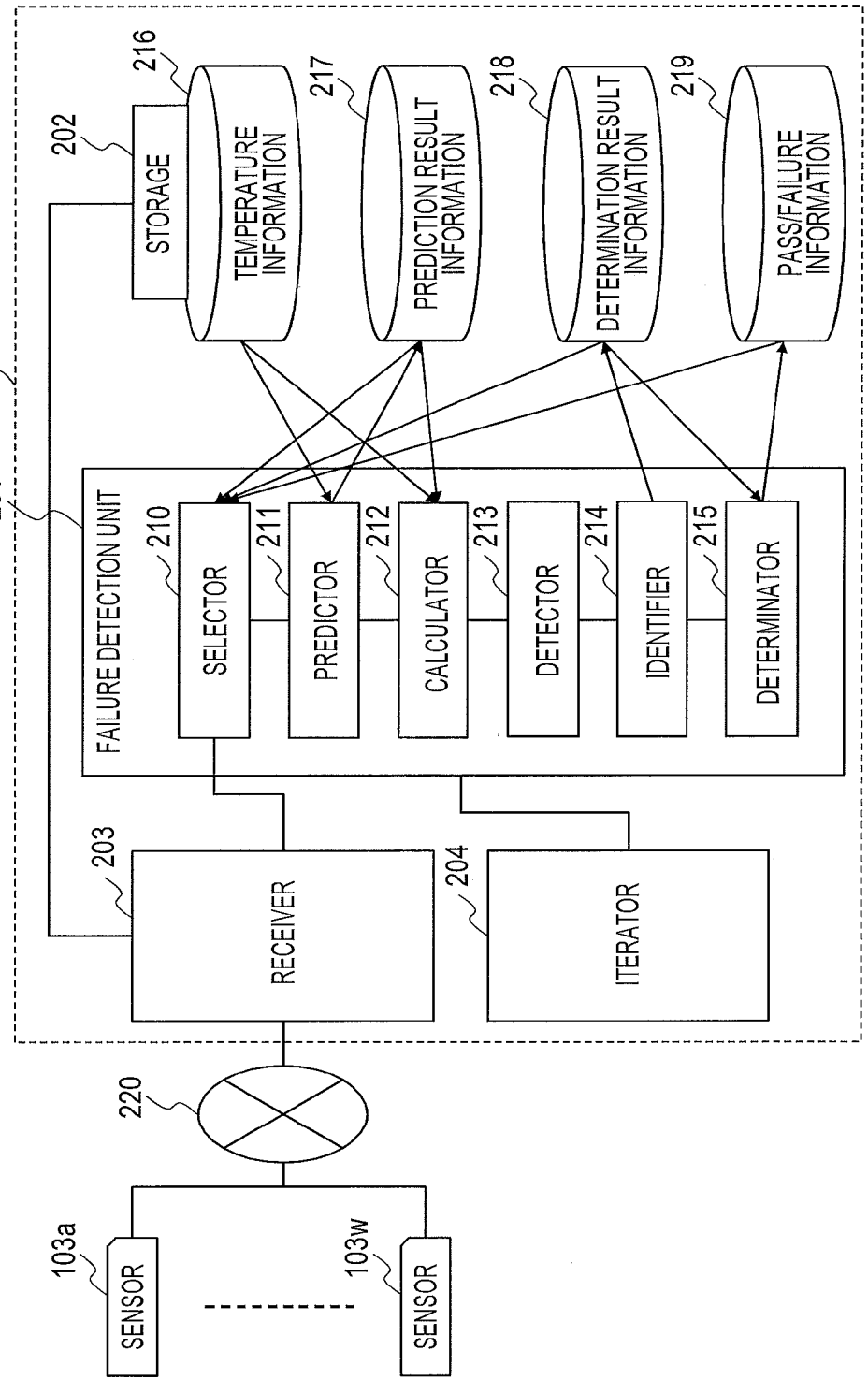
FIG. 2 is an explanatory diagram of a whole failure detection device according to the present embodiment.

FIG. 2 is an explanatory diagram of a failure detection device 200 according to the present embodiment. The failure detection device 200 includes a failure detector 201, a storage 202, a receiver 203, and an iterator 204. In addition, the failure detector 201 includes a selector 210, a predictor 211, a calculator 212, a detector 213, an identifier 214, and a determinator 215. The storage 202 stores therein temperature information 216, prediction result information 217, determination result information 218, and pass/failure information 219. Through a network 220, the receiver 203 receives pieces of temperature information from the sensors 103 installed in the data center 100. The iterator 204 controls the iteration and continuation of information processing performed in the failure detector 201.

From among the plural sensors 103 installed in the data center 100, the selector 210 selects a sensor to be a test target. The pieces of temperature information of the sensor 103, received by the receiver 203 at given time intervals, are saved in the storage 202. On the basis of the temperature information saved in the storage 202, the predictor 211 predicts the future temperature distribution of the data center 100. On the basis of a temperature distribution at a time, predicted by the predictor 211, the calculator 212 calculates a difference between a temperature the sensor 103 selected by the selector 210 is expected to indicate and a temperature measured by the sensor 103 at the same time as the time the predictor 211 has predicted. The detector 213 determines whether or not the difference calculated by the calculator 212 exceeds a given threshold value. The threshold value is decided with taking into consideration the policy of the management of the data center or a temperature condition (5° C. to 35° C.) at the time of the operation of a general server. For example, if the policy of the management of the data center is precise, the threshold value is set at or below 1° C. In such a case, when the above-mentioned difference has occurred for any length of time, it may be determined that a malfunction occurs in the sensor 103. On the basis of the determination result of the detector 213, the identifier 214 identifies whether the sensor 103 selected by the selector 210 normally functions or malfunctions. Owing to the frequency of a normal function or a malfunction identified by the identifier 214, the determinator 215 decides the failure of the sensor 103. The frequency is decided in accordance with the policy of the management of the data center. For example, if the policy of the management of the data center is precise, a failure is decided when the frequency of the determination of a malfunction with respect to the sensor 103 is greater than or equal to 50%.

The iterator 204 iterates the above-mentioned processing until the sensor 103 the selector 210 has not yet selected disappears. In addition, the above-mentioned processing is further iterated until the normal function or the failure of the sensor 103 is decided. The network 220 connecting the receiver 203 and the sensor to each other is a computer network connecting computers to one another. A local area network (LAN) used on a scale similar to about one facility, a wide area network (WAN) used between wider areas, or Internet serving as a global-scale computer network is utilized as the network 220.

(Example of Hardware Configuration of Failure Detection Device 200)

Figure 3:
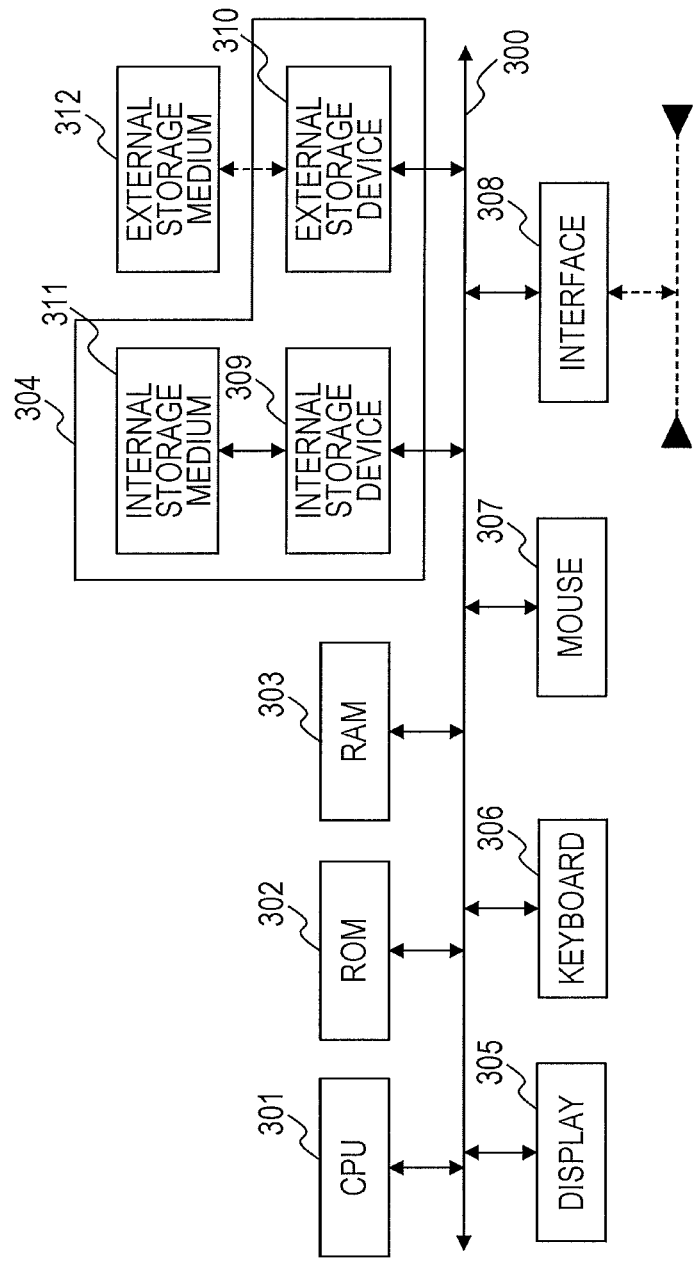
FIG. 3 is a block diagram illustrating an example of a hardware configuration of a design support device.

FIG. 3 is a block diagram illustrating an example of the hardware configuration of the failure detection device 200. In FIG. 3, the failure detection device 200 includes a central processing unit (CPU) 301, a read-only memory (ROM) 302, and a random access memory (RAM) 303. In addition, the failure detection device 200 includes a storage device 304 and an interface 308. In addition, the failure detection device 200 includes a display 305, a keyboard 306, and a mouse 307. In addition, the CPU 301 to the interface 308 are connected to one another owing to a bus 300.

The CPU 301 is an arithmetic processing unit governing the control of the whole failure detection device 200. The ROM 302 is a nonvolatile memory storing therein a program such as a boot program. The RAM 303 is a volatile memory used as a work area for the CPU 301.

The storage device 304 includes an internal storage device 309 holding therewithin a storage medium, and an external storage device 310 from which a storage medium is ejectable to outside. In addition, the storage device 304 is a controller controlling, in accordance with control by the CPU 301, reading and writing of data, performed on an internal storage medium 311 or an external storage medium 312. As the internal storage device 309, a magnetic disk drive or a solid state drive (SSD) may be selected in response to the type of the internal storage medium 311. The external storage device 310 is, for example, a magnetic tape device, a magnetic disk drive, a magnet-optical disk drive, an optical disk drive, an SDD, or the like. The external storage medium 312 is a nonvolatile memory storing therein data written owing to control by the external storage device 310. For example, when the external storage device 310 is the magnetic disk drive, the external storage medium 312 is, for example, a flexible disk (FD) serving as a magnetic disk. In addition, when the external storage device 310 is the optical disk drive, the external storage medium 312 is, for example, a Compact Disc Recordable (CD-R) or a Blu-ray Disc (BD), which serves as an optical disk. In addition, when the external storage device is the SDD, the external storage medium is a semiconductor element memory.

The display 305 is a device displaying pieces of data such as a document, an image, function information, and so forth, which include a cursor, an icon, or a toolbox. The display 305 is, for example, a cathode ray tube (CRT), a thin film transistor (TFT) liquid crystal display, a plasma display, an organic electroluminescence display, or the like.

The keyboard 306 is a device that includes keys used for inputting characters, numeric characters, various kinds of instructions, and so forth and inputs data. In addition, the keyboard 306 may also be a touch-panel-type input pad, a numerical keypad, or the like. The mouse 307 is a device performing the movement of a cursor, range selection, the movement of a window, the change of a size, and so forth. The mouse 307 may also be a trackball, a joystick, or the like if having the same function as a pointing device.

The interface 308 is a controller that is connected to the network 220 and controls inputting and outputting of data from and to an external device. The interface 308 corresponds to the type of the connecting network 220. The interface 308 is a network interface card (NIC) for, for example, a wired LAN or a wireless LAN.

FIG. 4 is a temperature information table 400 illustrating temperature information acquired by the sensor 103 in units of given times. The temperature information table 400 has been stored in the temperature information 216 in the storage 202. In the temperature information table 400, a time 401 is time information, a sensor ID 402 is the identification number of the sensor 103, and a temperature 403 indicates pieces of temperature information acquired by the sensors 103 having the individual sensors ID. For example, when focusing attention on a row 404, a temperature, 25.3142° C., measured by the sensor 103 at a time, 1.00, is recorded with respect to that sensor 103 whose sensor ID is 1.

Figure 5:
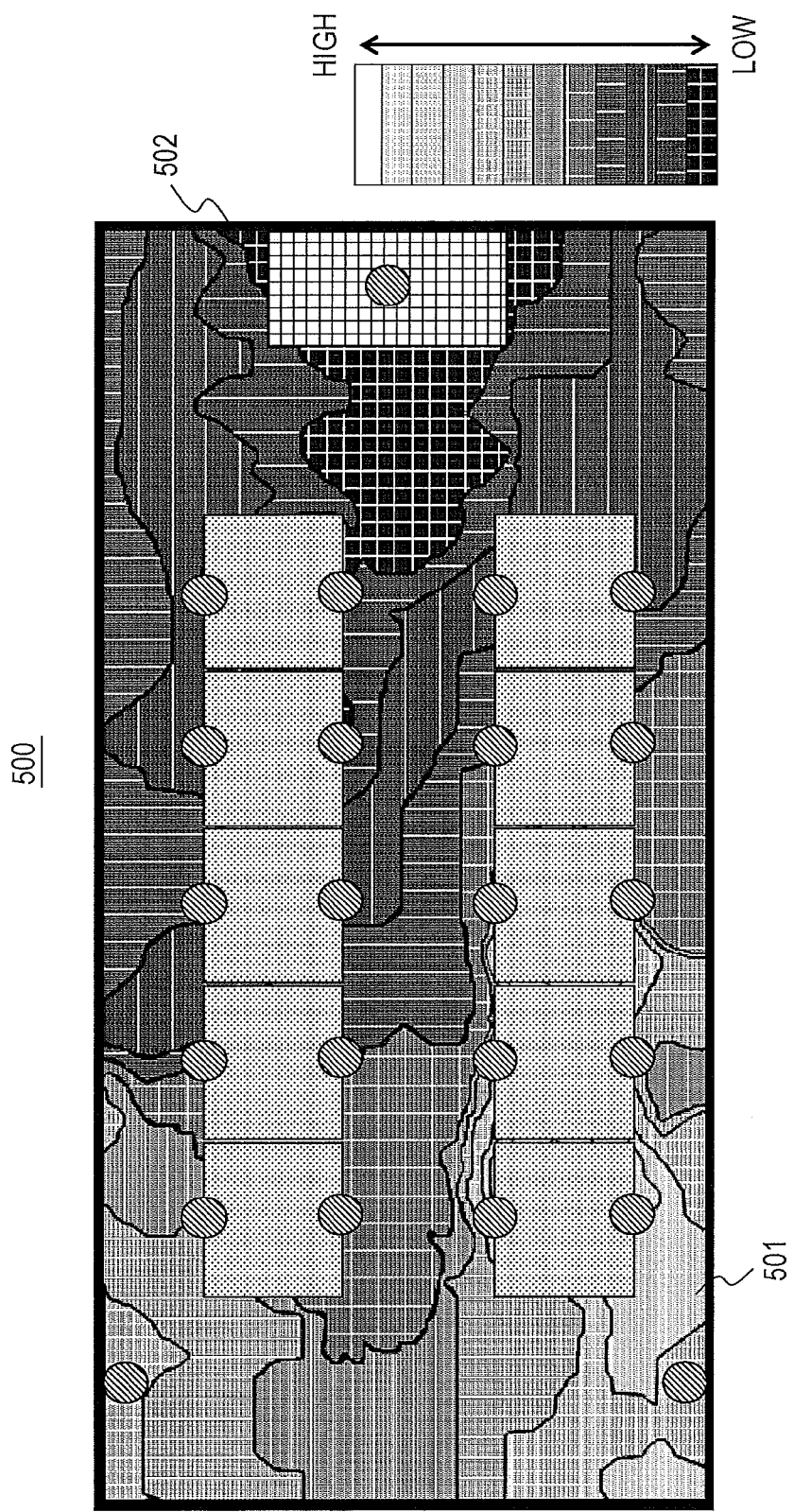
FIG. 5 is an explanatory diagram of a thermal fluid simulation according to the present embodiment.

FIG. 5 is a temperature distribution diagram 500 in which the temperature distribution of the data center 100 in the present embodiment is calculated owing to a thermal fluid simulation. In FIG. 5, a region 501 indicates a high-temperature region, and a region 502 indicates a low-temperature region. A plurality of curved lines between the region 501 and the region 502 are contour lines indicating temperature changes from the high-temperature region to the low-temperature region. The temperature distribution diagram illustrates a situation in which the temperature of the circumference of the air conditioner 101 becomes low and owing to heat from the 10 sets of the server racks 102, a temperature becomes high with the increasing distance from the air conditioner.

The thermal fluid simulation is a simulation based on a partial differential equation organized by the combination of a Navier-Stokes equation expressing a temporal change in the flow of a fluid such as air and a thermal advection-diffusion equation expressing a temporal change in heat. In general, by deriving, as the solution of a partial differential equation, a state $u(t+\Delta t)$ obtained by moving forward a state $u(t)$ at a time t by $\Delta t$, a physical simulation expressed owing to a time series performs time evolution. Expression 1 is a Navier-Stokes equation serving as a second-order nonlinear partial differential equation describing the movement of a fluid. Expression 2 is a continuous expression derived from the law of conservation of mass concerning an incompressible flow. Expression 3 is a thermal advection-diffusion equation describing thermal conduction within a fluid. The time evolution of a flow velocity field and a temperature field in the thermal fluid simulation is performed by solving simultaneous equations including Expressions 1 to 3.

$$\frac{\partial u}{\partial t} = \underset{(A)}{-(u \cdot \nabla)u} + \underset{(B)}{v\nabla^2 u} - \underset{(C)}{\frac{1}{\rho}\nabla p} + \underset{(D)}{f} \quad (1)$$

$$\nabla \cdot u = 0 \quad (2)$$

$$\frac{\partial T}{\partial t} = \underset{(E)}{-(u \cdot \nabla)T} + \underset{(F)}{\kappa \nabla^2 T} + \underset{(G)}{q} \quad (3)$$

Here, "u" represents the velocity vector of a fluid, "p" represents a pressure, "ρ" represents a density, "f" represents an external force affecting per unit mass, "v" represents a kinematic viscosity coefficient, "T" represents a temperature, "κ" represents a thermal conduction coefficient, "q" represents the amount of heat received from the outside, and "t" represents a time during a simulation.

A term (A) in Expression 1 and a term (E) in Expression 3 are advective terms. The advective term represents an effect moving along the fluid. The term (E) in Expression 3 includes the velocity vector of the fluid. This means that a temperature moves with the flow of the fluid. A term (B) in Expression 1 and a term (F) in Expression 3 are diffusion terms. The diffusion term represents a phenomenon in which the flow velocity field and the temperature field intend to be equalized. A term (C) in Expression 1 is called a pressure term. The pressure term represents a force affecting so as to satisfy Expression 2. A term (D) in Expression 1 is called an external force term. A term (G) in Expression 3 is called a generation term. The external force term and the generation term represent the influences of forces from the outside, such as a wind, gravity, and heat generation.

FIG. 6 is a simulation result table 600 illustrating the simulation result of a temperature distribution at a time in the data center 100. The simulation result table 600 is stored in the prediction result information 217 in the storage 202. In the thermal fluid simulation, the data center 100 is separated by meshes at give intervals. A cell number 601 is assigned to each cell separated by the corresponding mesh. In the simulation result table 600, the cell number 601 indicates the cell number of each cell, a velocity X 602 indicates the velocity of a wind velocity in an X-axis direction in each cell, a velocity Y 603 indicates the velocity of a wind velocity in a Y-axis direction in each cell, a velocity Z 604 indicates the velocity of a wind velocity in a Z-axis direction in each cell, and a temperature 605 indicates a temperature in each cell. For example, a row 606 indicates that, in a cell where "41" is assigned to a cell number, at a time, a temperature is 23.1781° C. and a wind blows with the wind velocities of 0.109233 m/s and 0.004313 m/s in the X-axis direction and the Y-axis direction, respectively. The simulation result table 600 may be provided as the initial values of the above-mentioned thermal fluid simulation, and may also be obtained as the result of the thermal fluid simulation.

FIG. 7 is a sensor time-series table 700 illustrating theoretical temperatures desired to be measured by the sensors 103 and obtained from the result of a thermal fluid simulation. The sensor time-series table 700 is stored in the prediction result information 217 in the storage 202. A theoretical temperature 703 at the position of a sensor ID 702 is illustrated, the sensor ID 702 identifying the sensor 103 at a theoretical time 701 in the thermal fluid simulation. For example, as illustrated in a row 704, the sensor 103 whose sensor ID is 13 is calculated to be 25.2597° C. at a time, 1.00. In addition, as illustrated in a row 705, the sensor 103 whose sensor ID is 13 is calculated to be 25.2382° C. at a time, 2.00.

Figure 8:
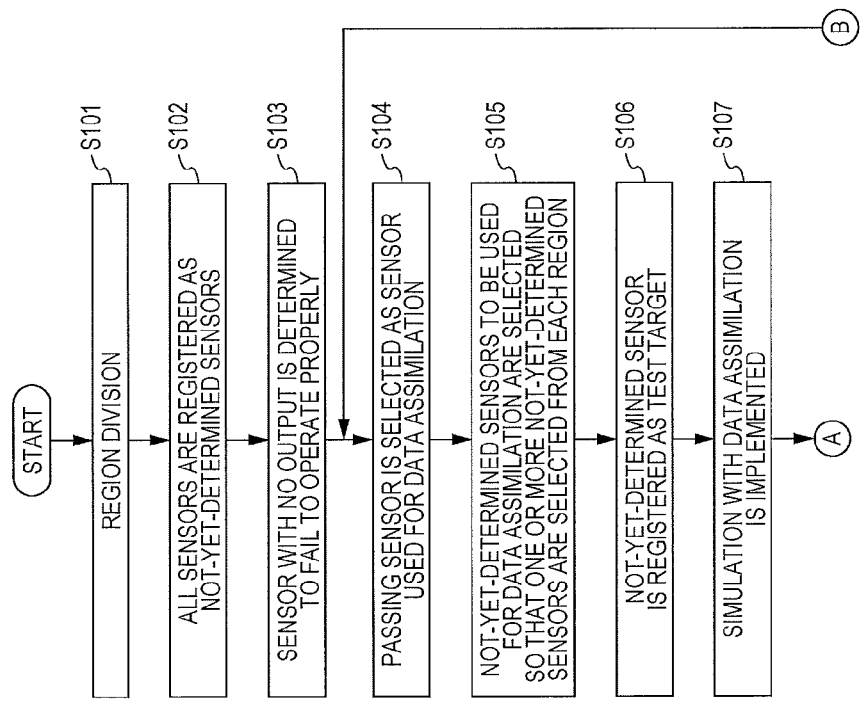
FIG. 8 illustrates an anterior half of a flowchart of whole processing according to the present embodiment.
Figure 9:
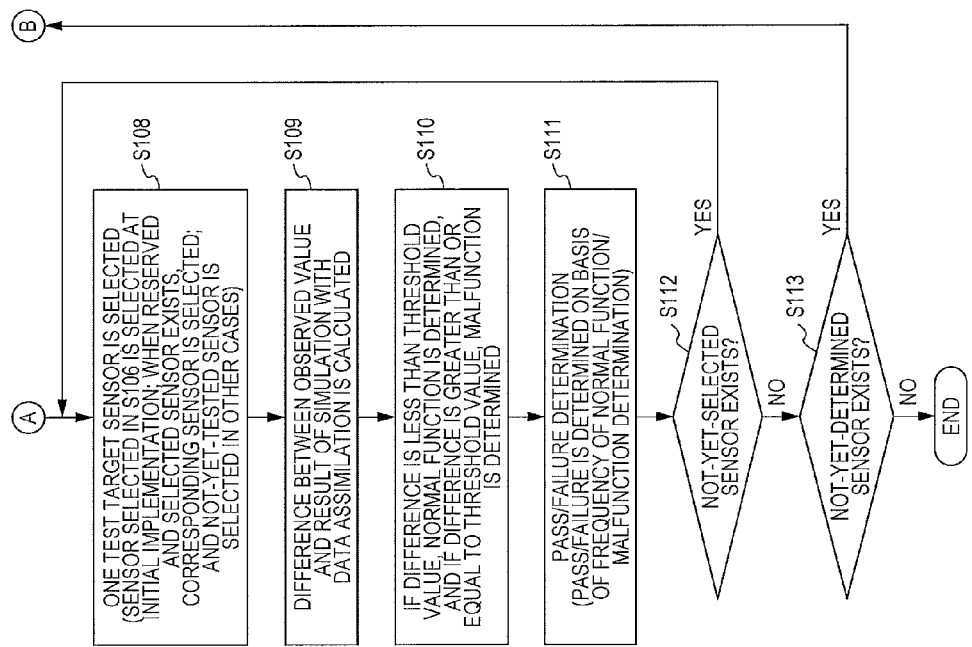
FIG. 9 illustrates a posterior half of a flowchart of whole processing according to the present embodiment.

FIG. 8 and FIG. 9 correspond to the whole flow of the present embodiment. Hereinafter, the operation of a sensor failure detection device will be described with reference to FIG. 8 and FIG. 9.

The sensor failure detection device 200 of the present embodiment divides a space within the data center 100 in which the sensor 103 serving as a test target has been installed, into regions (cells) having given sizes (step S101). The sensor failure detection device 200 is subjected to region division so that one or more sensors 103 are included in each region.

Next, the sensor failure detection device 200 records, in the determination result information 218 in the storage 202, all the sensors 103 within the data center 100, as not-yet-determined sensors (step S102). Here, the not-yet-determined sensor represents a sensor other than a sensor determined to pass or fail to operate properly on the basis that the number of times the sensor has been determined to normally function or malfunction owing to normal function/malfunction determination (step S101 to step S111) performed by the sensor failure detection device is greater than or equal to a given frequency.

Next, the selector 210 in the sensor failure detection device 200 determines that a sensor 103 with no output fails to operate properly, from among sensors 103 from which output temperature information may not be received (step S103). When the temperature information may not be received from the sensor 103, there exist a case where a specific sensor 103 fails to operate properly and a case where the network 220 is disconnected. The selector 210 in the sensor failure detection device 200 performs alive monitoring utilizing a simple network management protocol (SNMP) packet such as PING. On the basis of an alive monitoring result, the sensor failure detection device 200 may discriminate between the failure of the sensor 103 and the fault of the network 220. For example, when the response of the PING exists without the notification of a temperature from the sensor 103, the sensor failure detection device 200 determines not the fault of the network 220 but the failure of the sensor 103. On the other hand, when no response of the PING exists, the sensor failure detection device 200 determines that a physical problem occurs examples of which include a case where the sensor 103 does not exist or is fully damaged and a case where the network 220 is disconnected.

Next, from among the sensors 103, the sensor failure detection device 200 selects a passing sensor as a sensor used for data assimilation (step S104). Here, the data assimilation means combining an observed value with a model. Specifically, the data assimilation means applying a temperature distribution obtained from temperatures measured by the sensors 103 to the model of the thermal fluid simulation and performing a simulation. As for the selection of the passing sensor, the selector 210 selects a sensor 103 where pass has been recorded within the pass/failure information 219 in the storage 202. That the sensor 103 is recorded as pass means that "1" is recorded in a pass field 1603 in FIG. 16 described later.

Next, from among the not-yet-determined sensors registered in the step S102, the sensor failure detection device 200 selects one or more not-yet-determined sensors from each region divided in the step S101 (step S105). The selected not-yet-determined sensor serves as the target of the data assimilation of the thermal fluid simulation.

Next, the sensor failure detection device 200 selects one not-yet-determined sensor from among the not-yet-determined sensors registered in the step S102, and registers as a sensor serving as a test target (step S106).

Next, the sensor failure detection device 200 performs a thermal fluid simulation including the data assimilation, using the not-yet-determined sensor selected in the step S105 (step S107). Owing to the thermal fluid simulation, it may be possible to predict the flow velocity and the temperature (predicted temperature) of air at a time with respect to each region divided in the step S101.

Next, the sensor failure detection device 200 selects a sensor where the actual measured temperature of the sensor 103 and the result of the thermal fluid simulation in the step S107 are to be compared with each other (step S108). At the time of initial implementation, since the test target has been selected in the step S106, the same sensor as the sensor selected in the step S106 is selected. In addition, when a sensor exists that has been subjected to after-mentioned reservation and selection, the reserved and selected sensor is selected as the test target.

Next, the sensor failure detection device 200 performs calculation where, with respect to the sensor selected in the step S108, the actual measured temperature and the predicted temperature of a region including the corresponding sensor predicted in the thermal fluid simulation in the step S107 are compared with each other (step S109). Comparison between temperatures may be performed by simply calculating a difference, and may also be based on another calculation method capable of clarifying a difference between the actual measured temperature and the predicted temperature.

Next, on the basis of what value a value calculated in the step S109 is with respect to a predetermined threshold value, the sensor failure detection device 200 determines whether the corresponding sensor normally functions or malfunctions (step S110). In a case where the comparison in the step S109 is comparison obtaining a difference, if that difference value is less than the threshold value, it is determined that the corresponding sensor normally functions, and if the difference value is greater than or equal to the threshold value, it is determined that the corresponding sensor malfunctions.

Next, when, as the result of the determination in the step S110, the frequency of the determination of a normal function or a malfunction has exceeded a predetermined value, the sensor failure detection device 200 determines that the corresponding sensor passes or fails to operate properly (step S111). This step is a processing operation based on the assumption that processing operations subsequent to the step S108 have been repeated several times. As long as the frequency of the determination of a normal function or a malfunction does not exceed a predetermined frequency, the corresponding sensor is treated as a not-yet-determined sensor.

Next, the sensor failure detection device 200 determines whether a not-yet-selected sensor is left. When the not-yet-selected sensor is left, processing operations subsequent to the step S108 are repeated. When the not-yet-selected sensor does not exist, the processing proceeds to a subsequent processing operation (step S112). Here, the not-yet-selected sensor represents a sensor that has not yet been selected in the step S108.

Next, the sensor failure detection device 200 determines whether a not-yet-determined sensor is left. When the not-yet-determined sensor is left, processing operations subsequent to the step S104 are repeated. When the not-yet-determined sensor has disappeared, the processing is terminated (step S113).

Figure 10:
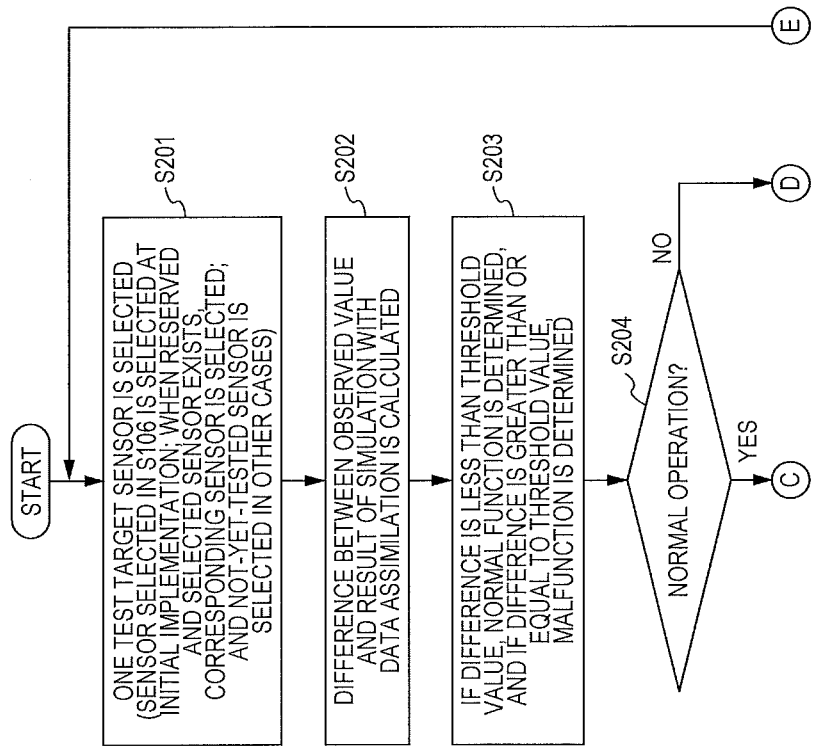
FIG. 10 is a portion of a flowchart illustrating an example of a selection processing procedure for a test target sensor according to the present embodiment.
Figure 11:
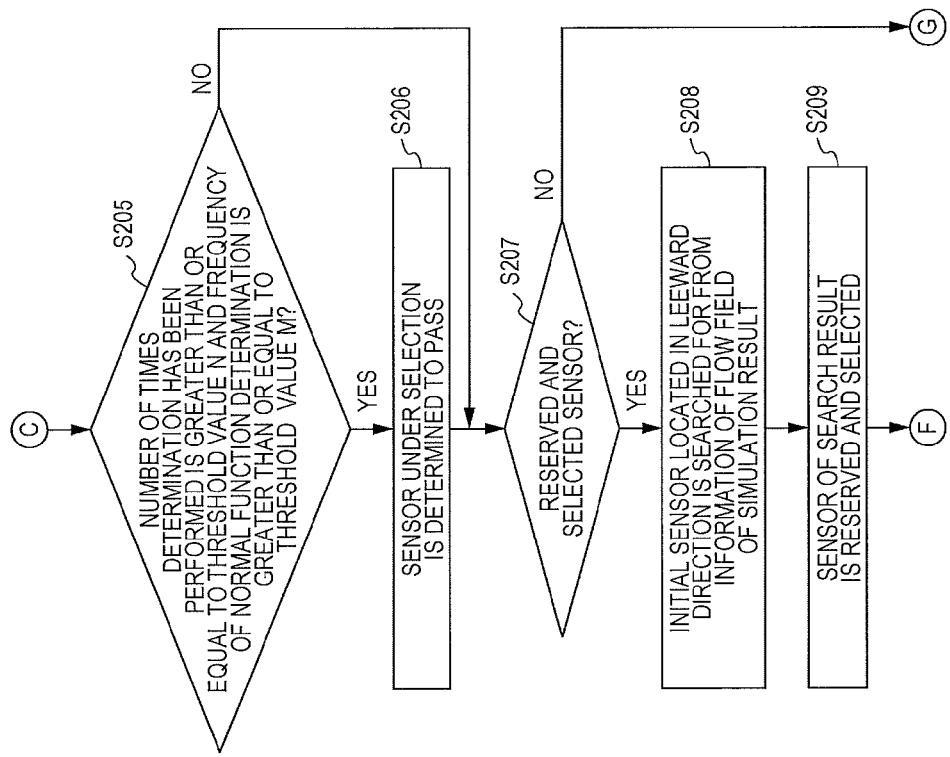
FIG. 11 is a portion of a flowchart illustrating an example of a selection processing procedure for a test target sensor according to the present embodiment.
Figure 12:
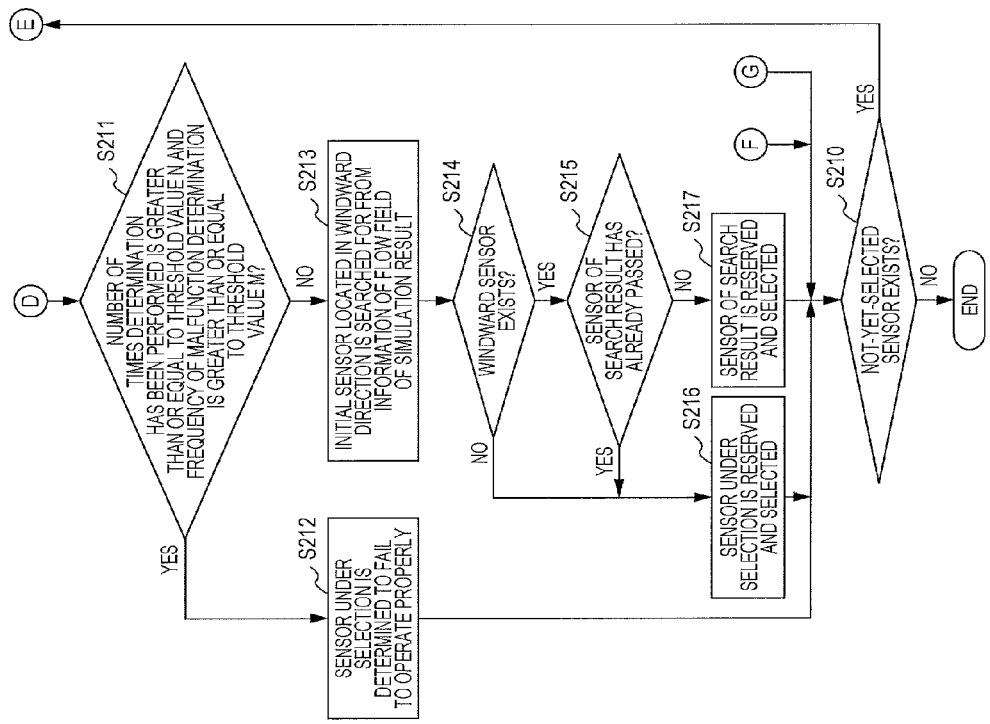
FIG. 12 is a portion of a flowchart illustrating an example of a selection processing procedure for a test target sensor according to the present embodiment.

FIG. 10 to FIG. 12 are flowcharts illustrating in detail the flow of iterative processing ranging from the step S108 to the step S112 described above. Hereinafter, using FIG. 10 to FIG. 12, the iterative processing in the present embodiment will be described. A step S201, a step S202, and a step S203 in FIG. 10 are the same processing operations as the processing operations described in the step S108, the step S109, and the step S110 described in FIG. 9, respectively.

(Case in which Normal Function is Determined in Step S204)

When the result of determination in a step S204 is a normal function, the sensor failure detection device 200 determines whether a frequency (M/N) has been exceeded, the frequency (M/N) meaning that the number of times determination has been performed with respect to a selected sensor is greater than or equal to a predetermined number of times (N times) and within that, the number of times the selected sensor has been determined to normally function is greater than or equal to a predetermined number of times (M times) (step S205).

When, in the step S205, it has been determined that the predetermined frequency has been exceeded, the sensor failure detection device 200 determines that the sensor under selection passes (step S206).

Next, the sensor failure detection device 200 determines whether the sensor under selection is a reserved and selected sensor (step S207). Reservation and selection will be described later.

When, in the step S207, it has been determined that the sensor under selection is the reserved and selected sensor, the sensor failure detection device 200 searches for an initial sensor located in a leeward direction, from the flow field information of a simulation result (step S208). The flow field information will be described later. The sensor failure detection device 200 registers, as a subsequent test target, the sensor found in the search in the step S208 (step S209). A processing operation registering this sensor as the subsequent test target is called the reservation and selection.

Next, the sensor failure detection device 200 determines whether a not-yet-selected sensor exists, the iterative processing is terminated when the not-yet-selected sensor does not exist, and the processing returns to the processing operation in the step S201 when the not-yet-selected sensor exists (step S210). Such determination processing is the same as the step S112.

(Case in which Malfunction is Determined in Step S204)

When the result of determination in the step S204 is a malfunction, the sensor failure detection device 200 determines whether a frequency (M/N) has been exceeded, the frequency (M/N) meaning that the number of times determination has been performed with respect to a selected sensor is greater than or equal to a predetermined number of times (N times) and within that, the number of times the selected sensor has been determined to malfunction is greater than or equal to a predetermined number of times (M times) (step S211).

When, in the step S211, it has been determined that the predetermined frequency has been exceeded, the sensor failure detection device 200 determines that the sensor under selection fails to operate properly (step S212).

On the other hand, when, in the step S211, it has been determined that the predetermined frequency has not been exceeded, the sensor failure detection device 200 searches for an initial sensor located in a windward direction, from the flow field information of the simulation result (step S213). The sensor failure detection device 200 determines whether or not a sensor exists on the windward (step S214), and registers the sensor under selection as a subsequent test target when no sensor exists (step S216). When a sensor exists on the windward, the sensor failure detection device 200 determines whether or not the found sensor has already passed (step S215). When the found sensor has already passed, the sensor failure detection device 200 registers the sensor under selection as the subsequent test target (step S216). When the found sensor has not yet passed, the sensor failure detection device 200 registers the found sensor as the subsequent test target (reservation and selection) (step S217).

Next, the sensor failure detection device 200 determines whether a not-yet-selected sensor exists. When the not-yet-selected sensor does not exist, the sensor failure detection device 200 terminates the iterative processing. When the not-yet-selected sensor exists, the sensor failure detection device 200 returns to the processing operation in the step S201 (step S210). Such determination processing is the same as the step S112.

Figure 13:
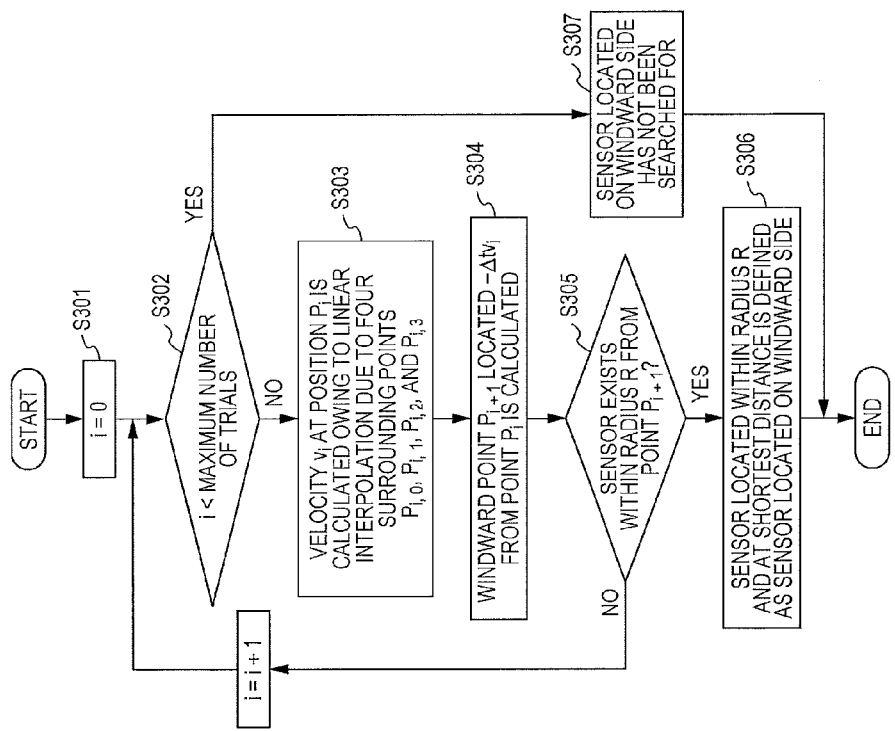
FIG. 13 is a flowchart illustrating an example of a search processing procedure for a test target sensor according to the present embodiment.

FIG. 13 is a detailed flow for searching for the above-mentioned windward sensor. A temperature propagates owing to air. The direction of the flow of air (wind) or the quantity of flow greatly influences a temperature change. Owing to such characteristics of the temperature and the wind, when a subsequent sensor 103 is selected after a sensor 103 has been tested, it may be possible to speed up the identification of a failed sensor 103 by selecting a sensor 103 located on a windward side. Hereinafter, using FIG. 13 and FIG. 14, a method for searching for a windward sensor will be described.

First, a counter i is initialized (step S301). Next, it is determined whether the counter i has reached the maximum number of trials (step S302). It is desirable that the maximum number of trials of the counter i is about several times, and the maximum number of trials of the counter i is desired to be set within 10 times at a maximum. The reason is that there is the problem of a processing speed caused by calculation corresponding to the maximum number of trials. In addition, every time the counter i is incremented, a distance from a sensor under selection is increased, and an influence on the sensor under selection is reduced. Accordingly, there is little advantage obtained by searching for a sensor in such a location. When the counter i does not reach the maximum number of trials, a flow velocity $v_i$ at the position $P_i$ of the sensor under selection is linearly interpolated owing to four points $P_{i,0}$, $P_{i,1}$, $P_{i,2}$, and $P_{i,3}$ surrounding the point $P_i$ (S303). Here, the four points $P_{i,0}$, $P_{i,1}$, $P_{i,2}$, and $P_{i,3}$ surrounding the point $P_i$ are the center points of individual cells. In addition, the $P_{i,0}$, $P_{i,1}$, $P_{i,2}$, and $P_{i,3}$ configure a minimal quadrangle containing the sensor under selection, within a quadrangle formed by line-connecting the individual points. While, here, for the sake of shorthand, two-dimensional representation is used, not four surrounding points but eight surrounding points are taken into consideration when three-dimensional representation is used.

Linear interpolation is calculated using the following Expressions 4 to 7.

An arbitrary position q is expressed by the following Expression 4. As for the position q, if the target space of the linear interpolation is two-dimensional, four points located in a nearest neighborhood are searched for and subjected to interpolation, and interpolation parameters $c_x$, $c_y$, and $c_z$ are calculated. Here, when the target space of the linear interpolation is two-dimensional, the $c_z=0$ is continuously satisfied.

$$q = \{q_x, q_y, q_z\} \quad (4)$$

$$c_x = \frac{q_x - x(i)}{x(i+1) - x(i)} \quad (5)$$

$$c_y = \frac{q_y - y(j)}{y(j+1) - y(j)} \quad (6)$$

$$c_z = \frac{q_z - z(k)}{z(k+1) - z(k)} \quad (7)$$

Here, when a wall passes medially across a rectangular parallelepiped formed by eight nearest neighbor points, the following processing is performed on the basis of a magnitude relation between the value of $q_x$ and the value of $W_{x0}$. When the value of the $q_x$ is smaller than the value of $W_x$, processing is performed with the value of the $c_x$ as "0". When the value of the $q_x$ is larger than the value of the $W_x$, processing is performed with the value of the $c_x$ as "1". In addition, when the $q_x$ is equal to the W, nothing is performed. In addition, when the wall of an xy-plane surface or a zx-plane surface passes medially across a rectangular parallelepiped, the same processing is also performed.

The velocity $v_i$ is calculated using Expression 8.

$$\begin{aligned}v_i = &(1-c_x)(1-c_y)(1-c_z)v(i, j, k) + \\ &c_x(1-c_y)(1-c_z)v(i+1, j, k) + (1-c_x)c_y(1-c_z)v(i, j+1, k) + \\ &c_x c_y(1-c_z)v(i+1, j+1, k) + (1-c_x)(1-c_y)c_z v(i, j, k+1) + \\ &c_x(1-c_y)c_z v(i+1, j, k+1) + \\ &(1-c_x)c_y c_z v(i, j+1, k+1) + c_x c_y c_z v(i+1, j+1, k+1)\end{aligned} \quad (8)$$

Next, a windward point $P_{i+1}$ is calculated at which the point $P_i$ is considered to be located a time $\Delta t$ ago (step S304).

$$P_{i+1} = P_i - \Delta t v_i \quad (9)$$

Next, with respect to all the sensors, it is tested whether a sensor exists within a radius R from the point $P_{i+1}$ (step S305). By evaluating Expression 10, it is determined whether a sensor exists within the radius R from the point $P_{i+1}$.

$$\|P_{i+1} - q_j\| < R, (j = 0, \ldots, m-1) \quad (10)$$

Here, m is the number of sensors, and $q_j$ is the position of a j-th sensor.

When, in the step S305, a sensor has been found within the radius R, a sensor located at the shortest distance is registered as a sensor located on a windward side (step S306).

After the counter i has reached the predetermined maximum number of trials, it is determined that a sensor located on a windward side has not been found (step S307).

Figure 14:
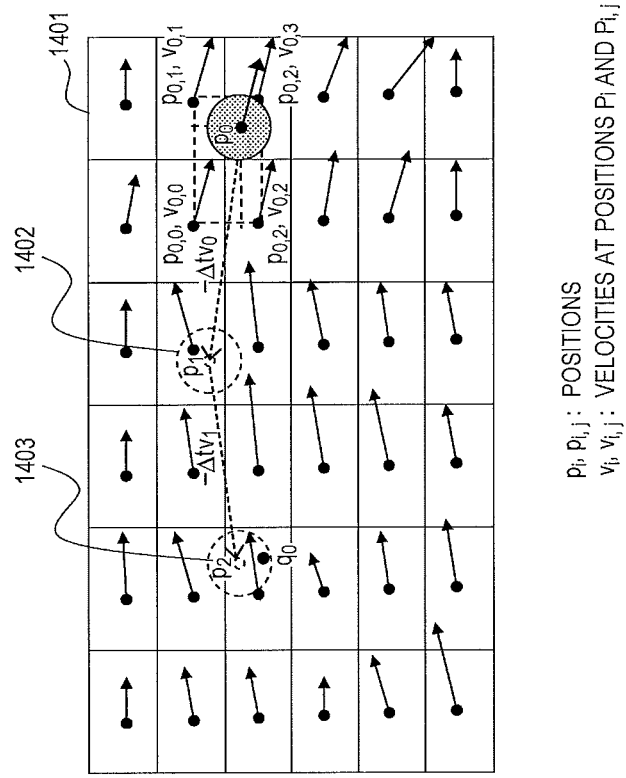
FIG. 14 is an explanatory diagram of a search processing procedure for a test target sensor according to the present embodiment.

FIG. 14 is a diagram graphically illustrating an image when the target space of linear interpolation is two-dimensional, with respect to the flow described in FIG. 13.

A flow velocity v0 at P0 is obtained owing to linear interpolation. Four P0,0, P0,1, P0,2, and P0,3 serving as the midpoints of meshes 1401 surrounding the P0 are subjected to linear interpolation, and the flow velocity v0 is obtained. Using Expression 9, a point P1 is obtained that goes back t seconds using the obtained flow velocity v0. While, using Expression 10, it is tested whether a sensor exists in a region 1402 falling within the radius R from the point P1, no sensor exists in the region 1402 falling within the radius R from the point P1. Accordingly, in the same way as the flow velocity v0, using linear interpolation, a flow velocity v1 at the point P1 is obtained. Using Expression 9, a point P2 is obtained that goes back t seconds using the obtained flow velocity v1. When, using Expression 10, it is tested whether a sensor exists in a region 1403 falling within the radius R from the point P2, a sensor is found that exists at a position q0. A sensor existing at such a position q0 is defined as a sensor located on a windward side.

FIG. 15 is a determination result information table 1500 serving as an example of a result obtained by determining, in the identifier 214, whether the sensor 103 normally functions or malfunctions. In the determination result information table 1500, a recording ID 1501 is the order of recording in the determination result information table 1500. A time 1502 is the time and date of recording in the determination result information table 1500. A sensor ID 1503 is the ID number of a sensor recorded in the determination result information table 1500. An error 1504 is a difference between a temperature measured by a sensor serving as a test target and the thermal fluid simulation result, the difference being calculated in the step S109. Normality 1505 indicates that a sensor serving as a test target has been judged to normally function. When a normally function has been determined in the step S110, "1" is recorded. Abnormality 1506 indicates that a sensor serving as a test target has been judged to malfunction. When a malfunction has been determined in the step S110, "1" is recorded.

When focusing attention on a row 1507 in the determination result information table 1500, whose recording ID is "1", a sensor whose sensor ID is "4" has been recorded in the field of the sensor ID 1503. This indicates that the sensor whose sensor ID is "4" has been selected as a test target. In addition, the error 1504 indicates that a difference value between a measured temperature and the temperature of the result of the simulation has been 0.23° C. Such a difference value falls below a threshold value. Accordingly, in the normality 1505, it is recorded that the number of times a sensor has been determined to normally function is "1".

A row 1508 whose recording ID is "2" is recording concerning a sensor whose sensor ID is "8". When a leeward sensor whose sensor ID is "4" has been searched for in the above-mentioned flowchart, the sensor whose sensor ID is "8 has been detected. Therefore, the sensor whose sensor ID is "8 has been selected as a test target sensor next to the sensor whose sensor ID is "4". Here, as for the sensor whose sensor ID is "8, since a difference value between the measured temperature and the temperature of the result of the simulation has been 10.32° C., it is recorded in the abnormality 1506 that the number of times a sensor has been determined to malfunction is "1".

FIG. 16 is an example of a result obtained by identifying the failure of the sensor 103 owing to the determinator 215.

With respect to each sensor ID 1601 in a pass/failure information table 1600, when a sensor passes, "1" is recorded in a pass 1603, and when a sensor fails to operate properly, "1" is recorded in the failure 1602. As for a not-yet-determined sensor, both of the pass 1603 and the failure 1602 become "0". For example, in a row 1604, it is recorded that the sensor 103 whose sensor ID 1601 is "1" passes.

Figure 17:
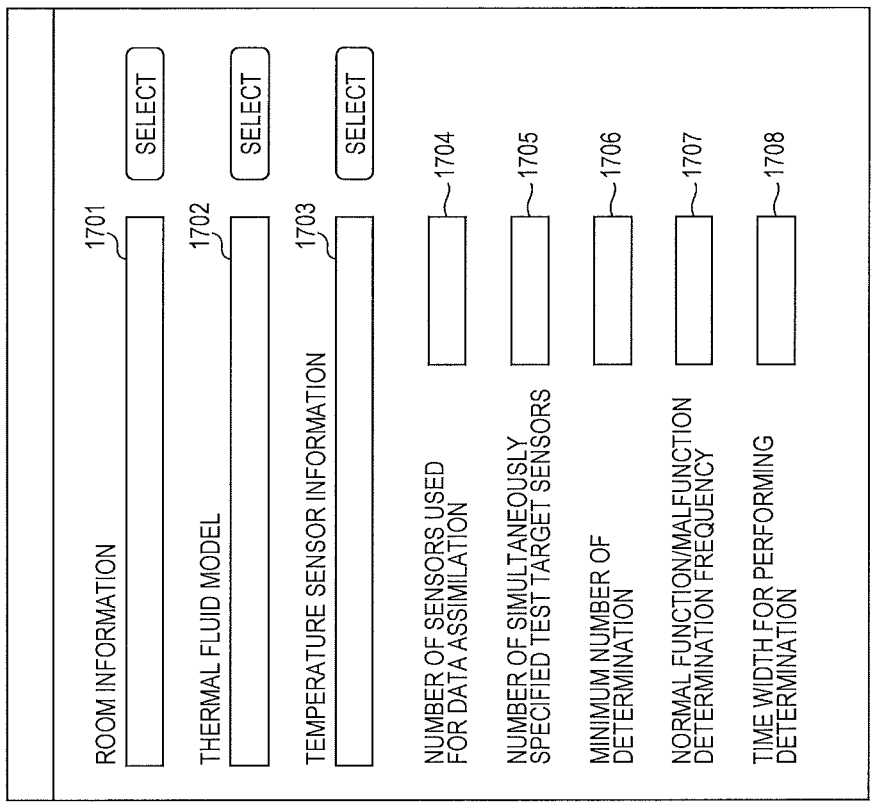
FIG. 17 is an explanatory diagram illustrating an example of a screen configuration according to the present embodiment.

FIG. 17 is the image diagram of a screen into which a user inputs the operating condition of the failure determination system 200 when the present embodiment is implemented.

In room information 1701, the user may select a file in which information about a data center is described. The information about a data center is, for example, the digital data of a drawing. The digital data of a drawing includes, for example, the dimension of a building, the shapes of a room and a pillar, a device configuration, and so forth. A thermal fluid model may also be configured so that the user is able to read a file in which an existing thermal fluid model is recorded. The thermal fluid model 1702 may also include the dimension data of meshes in the data center 100. The user may also cause the temperature sensor information 1703 to read a file recording therein basic information such as the positions of temperature sensors or the performance file of previous measured temperatures.

In a number-of-sensors 1704 used for data assimilation, the user may also specify the number of sensors used in the data assimilation. While, in the present embodiment, the selector 210 selects a sensor used for the data assimilation, for the sake of simplifying a calculation amount, the user may also set the upper limit of a used number. In a number-of-simultaneously-specified-test-target-sensors 1705, the user may also input the number of sensors simultaneously specified as test targets. In the present embodiment, for the sake of shorthand, a case has been described in which the number of sensors under selection is "1". However, when the capability of a sensor failure detection device is sufficient for targeting a plurality of sensors, two or more sensors may also be specified as test targets. A minimum-number-of-determination 1706 and a normal function/malfunction determination frequency 1707 influence the accuracy of determining the failure of a sensor. When temperature management is precisely performed in the data center, the user may set the numerical values of the minimum-number-of-determination 1706 and the normal function/malfunction determination frequency 1707 to small values. In a time width 1708 for performing determination, the user may also set a time interval during which the user causes the failure determination system 200 to operate. A value to be input to the time width 1708 for performing determination may be set by the user in accordance with the capability of the sensor failure detection device 200 or the policy of the temperature management of the data center.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A sensor failure detection device for a plurality of sensors, comprising:
   a storage that stores temperatures measured by the plurality of sensors;
   a predictor that predicts a future temperature distribution expected to occur at a certain time by performing a thermal fluid simulation based on the temperatures stored in the storage;
   a selector that selects a first target sensor from among the plurality of sensors;
   a calculator that calculates a difference value between a predicted temperature of the first target sensor in the temperature distribution and a measured temperature measured by the first target sensor at the certain time;
   a detector that determines whether the difference value exceeds a given threshold value;
   an identifier that identifies whether the first target sensor functions normally or malfunctions;
   a determinator that determines that the first target sensor is a failed sensor when a number of times that the first target sensor is identified as a malfunctioning sensor by the identifier exceeds a predetermined number of times; and
   an iterator that detects an upstream sensor located on a windward side of the first target sensor, from prediction of a flow field of air due to the thermal fluid simulation, and selects the upstream sensor as a second target sensor.

2. A computer-readable, non-transitory medium storing a sensor failure detection program that causes a computer to perform a procedure, the procedure comprising:
   storing temperatures measured by a plurality of sensors in a storage;
   predicting a future temperature distribution expected to occur at a certain time by performing a thermal fluid simulation based on the temperatures stored in the storage;
   selecting a first target sensor from among the plurality of sensors;
   calculating a difference value between a predicted temperature of the first target sensor in the temperature distribution and a measured temperature measured by the first target sensor at the certain time;
   determining whether the difference value exceeds a given threshold value;
   identifying whether the first target sensor functions normally or malfunctions;
   determining that the first target sensor is a failed sensor when a number of times that the first target sensor has been identified as a malfunctioning sensor by the identifier exceeds a predetermined number of times;
   detecting an upstream sensor located on a windward side of the first target sensor, from prediction of a flow field of air due to the thermal fluid simulation; and
   selecting the upstream sensor as a second target sensor.

3. A method for detecting a failure of a sensor with a computer including a memory and a processor, the method comprising:
   storing temperatures measured by a plurality of sensors in a storage;
   predicting a future temperature distribution expected to occur at a certain time by performing a thermal fluid simulation based on the temperatures stored in the storage;
   selecting a first target sensor from among the plurality of sensors;

calculating a difference value between a predicted temperature of the first target sensor in the temperature distribution and a measured temperature measured by the first target sensor at the certain time;
determining whether the difference value exceeds a given threshold value;
identifying whether the first target sensor functions normally or malfunctions;
determining that the first target sensor is a failed sensor when a number of times that the first target sensor has been identified as a malfunctioning sensor by the identifier exceeds a predetermined number of times;
detecting an upstream sensor located on a windward side of the first target sensor, from prediction of a flow field of air due to the thermal fluid simulation; and
selecting the upstream sensor as a second target sensor.

* * * * *